United States Patent [19]

Bagley

[11] Patent Number: 4,478,488

[45] Date of Patent: Oct. 23, 1984

[54] INFORMATION TRANSMISSION USING DISPERSIVE OPTICAL FIBERS

[75] Inventor: Brian G. Bagley, Watchung, N.J.

[73] Assignee: AT&T Bell Laboratories, Murray Hill, N.J.

[21] Appl. No.: 543,231

[22] Filed: Oct. 21, 1983

Related U.S. Application Data

[63] Continuation of Ser. No. 203,356, Nov. 3, 1980, abandoned.

[51] Int. Cl.³ .................... G02B 5/14; G02B 5/172
[52] U.S. Cl. .................... 350/96.23; 250/227; 350/96.24; 350/96.29; 350/96.33
[58] Field of Search ........... 350/96.10, 96.23, 96.24, 350/96.25, 96.29, 96.33; 250/227; 358/901; 455/610, 612; 370/1, 2, 3, 4

[56] References Cited

U.S. PATENT DOCUMENTS

| | | | |
|---|---|---|---|
| 1,751,584 | 3/1930 | Hansell | 250/227 X |
| 3,838,278 | 9/1974 | Duguay et al. | 250/227 |
| 3,849,604 | 11/1974 | Benes et al. | 370/4 X |
| 3,892,468 | 7/1975 | Duguay | 250/227 X |
| 4,128,759 | 12/1978 | Hunt et al. | 455/612 |
| 4,134,642 | 1/1979 | Kapron et al. | 350/96.33 |
| 4,227,771 | 10/1980 | Nolan | 350/96.29 |
| 4,296,319 | 10/1981 | Franks et al. | 250/227 |

FOREIGN PATENT DOCUMENTS

1357156  6/1974  United Kingdom ............ 350/96.26

*Primary Examiner*—William L. Sikes
*Assistant Examiner*—Frank González
*Attorney, Agent, or Firm*—James H. Fox

[57] ABSTRACT

A multiwaveguide cable in which the waveguides have different overall lengths can be made by twisting the waveguides during cabling. Waveguides situated at the "outside" of the cable will be longer than those on the "inside". Such cables can be used for generating pulses, as passive scanners, for time division multiplexing for equalizing frequency dispersion and for many standard delay functions. Also disclosed are multicore fibers.

13 Claims, 9 Drawing Figures

INFORMATION TRANSMISSION USING DISPERSIVE OPTICAL FIBERS

This is a continuation of application Ser. No. 203,356, filed Nov. 3, 1980, now abandoned.

BACKGROUND OF THE INVENTION

Transmission of intelligent information via light traveling along glass fibers is on the threshold of commercial reality. In earlier investigations of appropriate systems and glass fiber structures the bulk of the development activity has involved single fibers. However, it is clear that commercial communication systems will employ multiple fibers bound together in some fashion to form a multifiber cable. A part of the recent activity in optical systems has focused on manufacturing methods, structures, and uses for multifiber cable.

There are several potential uses for a multifiber cable in which different fibers within the cable have different transit times for a given cable length. A common pulse applied to the fiber bundle at one end of the cable will arrive at the other end in a series of pulses separated by the difference in transit times. This kind of fiber bundle has been called an "organ array" and is described in U.S. Pat. No. 3,892,468 issued July 1, 1975 to M. A. Duguay and assigned to Bell Telephone Laboratories, Incorporated. Potential uses for organ arrays appear in U.S. Pat. No. 3,838,278 issued Sept. 24, 1974 also to M. A. Duguay, describing an optical switching network, and U.S. Pat. No. 3,849,604 issued Nov. 19, 1974 to E. Benes and M. A. Duguay, describing a time slot interchanger for a time division multiplexing system. Fiber bundles of this type can be used for more basic functions. Moderate lengths are equivalent to multiple tap variable delay lines. They can also be used as pulse generators or for time division multiplexing by combining the outputs, or as scanners with the spatial disposition of the output ends in the output plane defining the raster. The different fiber lengths can be employed to compensate for frequency dispersion when different fibers in the array are used to transmit different frequency bands. There are undoubtedly a variety of other uses for such fiber arrays.

STATEMENT OF INVENTION

This invention is directed to optical fiber cables in which the transmission paths for individual fibers in the cable are controllably different. It involves a cabling operation in which the multiple fibers are twisted while forming the cable. Individual fibers are spaced from the axis of the twist by different distances. This causes some fibers to twist more than others and extends physically the length of a fiber located at the outside of the bundle compared to one that is nearer the inside of the bundle.

The most straightforward way to produce such a bundled fiber is to draw several discrete fibers at once and twist them together. Conventional multiwire communication cable is often manufactured by a similar method, in that wires are twisted during cabling to minimize capacitive coupling between individual pairs of wires. However, the multiple wires are typically spaced at equal distances from the center of the cable, i.e., around one or more circumferences of the cable, so that after winding each wire or group of wires is of equal length.

Proper design of the cabling equipment will produce a multifiber cable of the kind described here by disposing the individual fibers at unequal distances from the cable axis as the fibers are twisted.

Greater dimensional control over the relative lengths of the individual fibers can be obtained by fixing the position of each fiber with respect to the cable axis. A convenient structure that gives this result is a multicore cable, i.e., a single fiber cable that has more than one core imbedded in a single cladding. The position of each core relative to the cable axis may be constant throughout the cable. When this structure is twisted during manufacture, the difference in length between the helical cores is established precisely.

These and other aspects of the invention are described in greater detail in the following sections.

Figure 1:
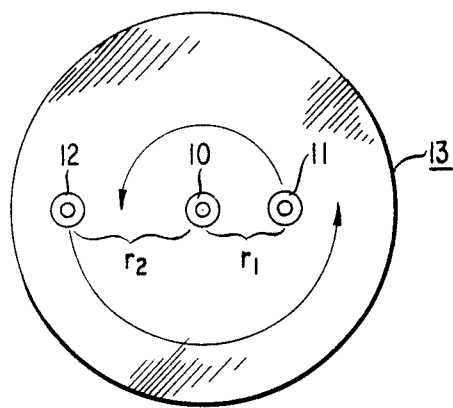
FIG. 1 is a schematic diagram illustrating the principle on which this invention is based.

The principle on which the various embodiments of the invention is based is evident from FIG. 1, taken with the understanding that when the fibers 10, 11, and 12 making up the fiber cable 13 are twisted, the overall length of each fiber will be different. Fiber 10, located at the cable axis, has a length corresponding to the cable length. Fiber 11, located at a distance $r_1$ from the cable axis, traverses a helical path and is therefore longer than fiber 10 by a distance equivalent to the number of helical turns times the circumference of the helix. The fiber 12 is yet longer than fiber 11 by a factor of $r_2/r_1$ (assuming an equal number of turns).

Figure 2:
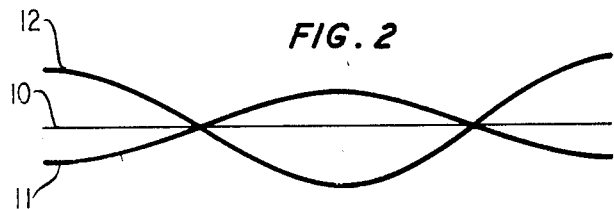
FIG. 2 is a schematic representation of a three fiber cable twisted to give different transmission lengths.

The principle just described is graphically evident in FIG. 2 where the lengths of fibers 10, 11, and 12 are obviously different.

The fiber bundle of FIG. 1 is shown with the individual fibers separated for simplicity. An actual cable would normally contain several more fibers and all the fibers would be cabled in a bundle with the position of each fiber relative to another and relative to the axis of the cable fixed by the position that fiber is held while the cable is formed. For example, individual fibers turn off a reel and the reel is stationed at a fixed position with respect to the cable axis. The bundle is twisted by conventional cabling equipment to give the structure represented in FIG. 2. In FIG. 2 the helices are shown to be congruent, i.e., with equal lengths for each turn of the helix and with the three fibers in a common plane (as shown in FIG. 1). Neither of these conditions is necessary to meet the objectives of the invention although either may be desired from one or another standpoint.

The differential length of the respective fibers is a linear variable of the radius of the helix and the number of turns in the helix. The latter parameter is expressed as turns per cable length, e.g., turns per meter, and can vary over wide ranges without critically affecting the transmission capability of the cable. The radius of the helix depends closely on the nature of the cable structure being considered. For bundled fibers, where each fiber is located physically by the position of its neighbors, the radius of the helix is determined by the thickness of the fibers and the order of the fiber during twisting. The radius for the first order fiber is simply the diameter of the fibers, assuming the fibers to have equal diameters. If the fibers are twisted with several fibers "in line" as shown in FIG. 1, the radius for each helix will be the diameter of the fiber times the position of the fiber. The "in line" structure is a convenient structure from many standpoints and is typically made in cable form as a tape. Obviously, a tape twisted about its middle during manufacture will have sets of two fibers with equal lengths. Tape structures are preferred in the context of the invention because of the tight control afforded over the radius dimension. The ease with which tapes can be handled, and spliced with the proper fiber to fiber organization, are traditional benefits. A multifiber tape can also be twisted about either outside fiber to produce a continuum of length differentials from one side of the tape to the other.

Figure 3:
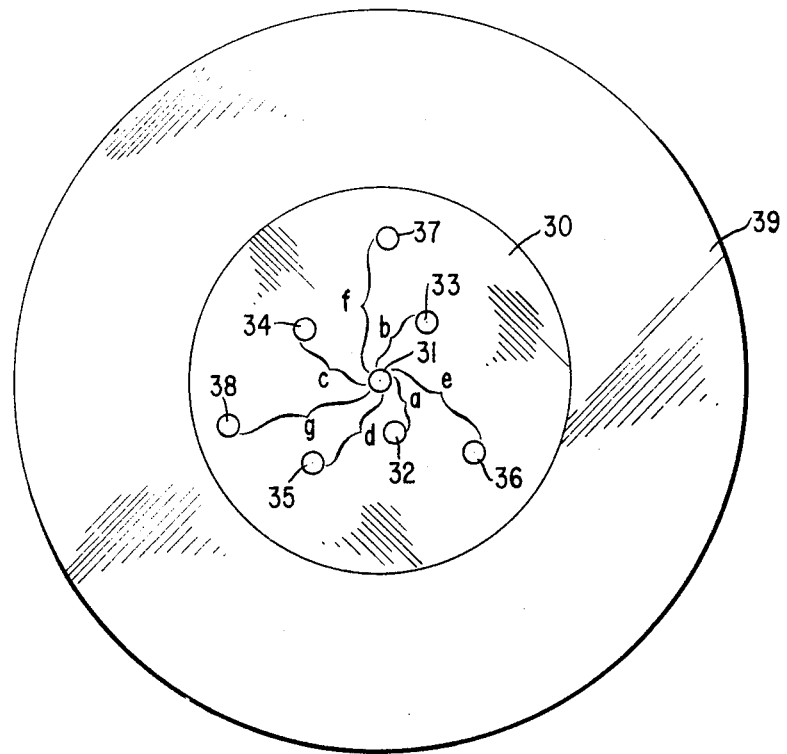
FIG. 3 is a sectional view of a multicore cable made in accordance with a preferred embodiment of the invention.

A preferred form of multifiber cable is shown in cross section in FIG. 3. This cable has a single cladding material 30, surrounding a plurality of active cores 31–38 spaced from the central core 31 by increasing distances denoted a–g. This structure will be referred to here as a multicore fiber. The convenience of "immersing" many fibers in a single cladding will be appreciated from several standpoints; but one that is especially relevant in the context of this invention is the precise control maintained over the distances a–g as compared with the fiber bundle (FIG. 1) in which these distances are assumed to be maintained during the twisting operation. That multicore fiber in FIG. 3 is shown coated with a conventional jacket material 39, typically a plastic, for physical protection.

To evaluate the magnitude of the signal delay that is obtainable in fiber structures with typical dimensions refer to FIG. 1 and assume that $r_2$ is 160 microns. The circumference of each helical twist that fiber 12 undergoes is 0.1 cm. If the fiber is twisted, e.g., 10 turns per meter, then fiber 12 will exceed fiber 10 in length by 1.0 cm/meter. Over a kilometer of cable the difference becomes 10 meters. The velocity of light in glass is of the order of $2 \times 10^8$ meters/sec. Therefore the signal delay between fiber 10 and fiber 12 will be 50 nsec.

The straightforward ways of increasing or decreasing the transmission time between fibers 10 and 12 is to change $r_2$ or change the frequency of helical twists. The number of twists could presumably vary between a few per meter to several hundred per meter. As the twists become "tighter" microbending losses are introduced. The dimension $r_2$ can be varied considerably and is constrained mainly by the overall size of the fiber that is desired in a particular cable structure. The dimensional control between radii, for example between $r_1$ and $r_2$ is expected to be reasonably assured to tens of microns, and perhaps less.

Figure 4:
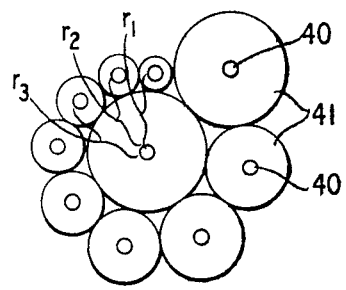
FIG. 4 is a sectional view of an alternative cable design in which a plurality of discrete fibers are twisted together to give a structure similar to that of FIG. 1.

Yet another cable configuration that meets the objectives outlined here is shown in FIG. 4. This structure is somewhat of a compromise between those of FIGS. 1 and 3 in that the radii, e.g., $r_1$, $r_2$, $r_3$, are not fixed by immersing the cores in the cladding as in the structure of FIG. 3, but yet are fixed by the combined radii of the cladding or the fiber coating (or both) in the manner evident from the figure, and not simply by the organization of the fibers during twisting as in the structure exemplified by FIG. 1. The structure in FIG. 4 has a single "tier" of fibers about the axial fiber but additional "tiers" could be wound about those shown to create a larger bundle.

FIG. 4 shows a multiplicity of fibers each having a core 40 surrounded by a medium 41. Schematically 41 can be equated with a glass cladding, or a clad fiber coated for protection with a plastic coating or the like (not shown). Alternatively the structure of FIG. 4 represents a plurality of cores 40 coated directly with a protective plastic coating 41. An obvious variation of those structures is one wherein the diameter of the core 40 varies to give the desired result, or the diameters of 40 and 41 both vary.

The manufacture of multifiber cables of the kind shown in FIGS. 1 and 4 can be accomplished in a straightforward way for following existing cabling technology and winding together reels of appropriate fibers, in the first instance of a common diameter and in the second, of varying diameters. Making a multicore cable of the kind shown in FIG. 3 requires modification of conventional fiber drawing procedures, although the details of the drawing process follow existing technology.

Figure 5:
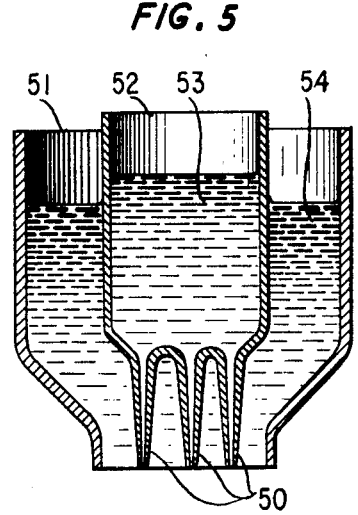
FIG. 5 is a schematic representation of an apparatus useful for making the multicore fiber of FIG. 3.

One alternative for drawing multicore fibers is illustrated in FIG. 5. The basic technique relies on the known crucible technique described, e.g., by W. G. French et al in the *Annual Review of Materials Science*, Volume 5, 1975, pp. 373–394. The crucible technique is modified as indicated in FIG. 5 by simply creating several internal nozzles 50 within the external crucible 51. The nozzles 50 can communicate with a common crucible 52 containing the molten glass 53 that forms the multiple cores. Individual crucibles containing different glass compositions can be used in association with each nozzle. The outer crucible 51 contains the cladding glass 54. The nozzles 50 are arranged to form the desired core pattern. This procedure can be used to draw the multicore fiber directly or may be used in an enlarged geometry to draw a glass preform from which a multicore fiber is then drawn by the standard preform technique.

Figure 6:
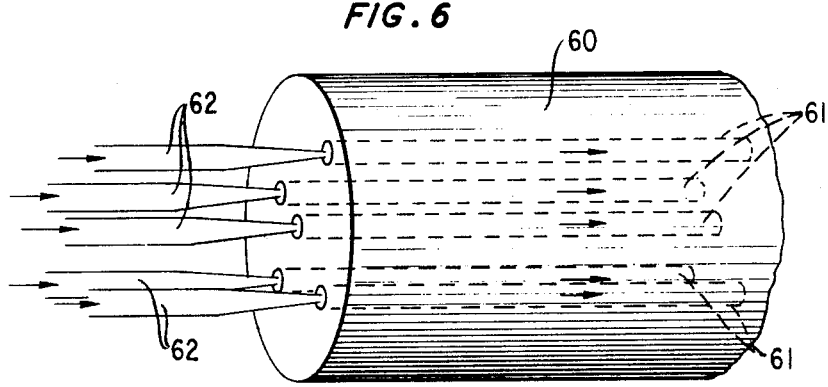
FIG. 6 is a representation of a process that is alternative to that described in connection with FIG. 5.

Another approach to making multicore fibers is shown in FIG. 6. The technique used here is the well known preform technique, also described in the French et al paper, supra. In FIG. 6 the cladding material 60 is a glass tube, prepared, e.g., by extrusion, with multiple channels 61 extending longitudinally along the tube. The channels are arranged in cross section in a pattern similar to that shown in FIG. 3. The cores, (31–38 in FIG. 3) are formed by a conventional process in which an appropriate core precursor material is deposited via vapor deposition devices 62 into each of the channels 61. The composition of the deposited material may be the same for each core, or may differ to give cores of different refractive index. After deposition the hollow preform is collapsed in the standard way and the multicore fiber is drawn.

Another way to produce a preform for a multicore fiber is the rod and tube method described also by French et al, supra. The tube in this case would be a cylinder of cladding material with multiple channels as shown in FIG. 6. Rather than depositing the core material, as discussed above, the cores are formed by inserting glass rods of appropriate core material into the channels and consolidating the structure.

It is important to appreciate that the multiwaveguide cables described here are made most advantageously by twisting the multiwaveguides while the cable is being formed. Twisting multifiber bundles or multicore fibers after they are produced results in a highly stressed structure and only achieves a difference in waveguide length to the extent that the glass waveguides can be stretched. It is therefore a preferred feature of the fiber bundles of this invention that individual fibers in the bundle be of unequal length when unstrained. Twisting of fibers for multifiber cable was mentioned earlier. Twisting of the multicore structures can be achieved by rotating the preform or the crucibles while the multicore fiber is being drawn.

Cables incorporating the features of the invention can be made with only part of the overall cable length twisted. For example, if the multiple waveguides were to be used to transmit a plurality of individual signals at different frequency bands over a long length of cable, so that the signals near the end of the line arrive dispersed, then a terminal length of the cable can be twisted according to the invention so that the various signals arrive at the terminal simultaneously.

It is evident that selective time compression of signals as well as time delay can be achieved in a twisted waveguide cable, the difference being largely philosophical. Following this reasoning, systems combining both become apparent. An example of such a system—a multiplexed system in which the central section is a single channel—is described below in connection with FIGS. 7-9. A simpler system, using discrete channels, has a dispersive section coupled to a standard multiwaveguide transmission section, then another dispersive section opposite to the first. Signals will propagate spatially out of phase throughout, which for some system has advantages in minimizing channel coupling phenomena.

Figure 7:
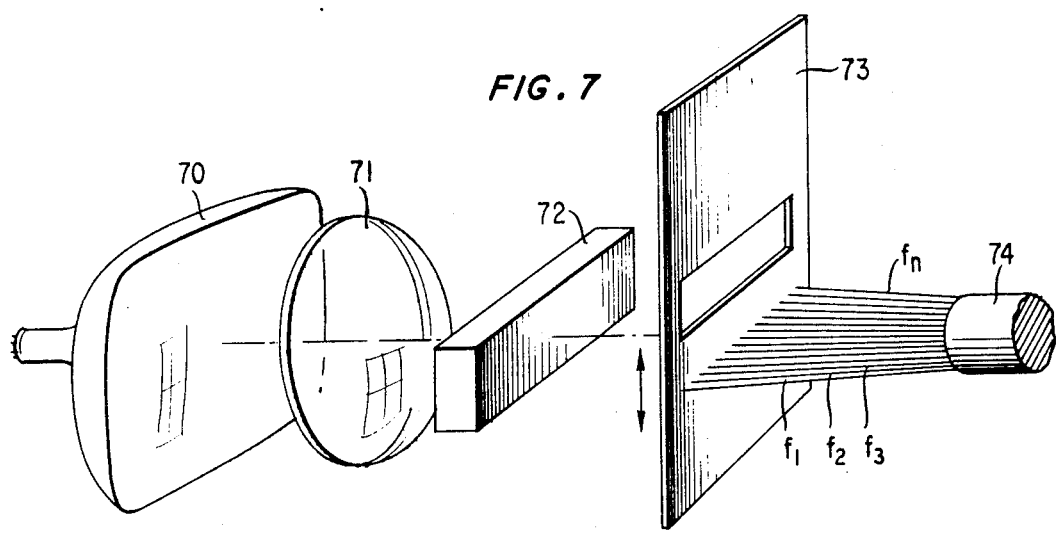
FIG. 7 is a schematic diagram of a video encoding system using a fiber cable according to the invention.
Figure 8:
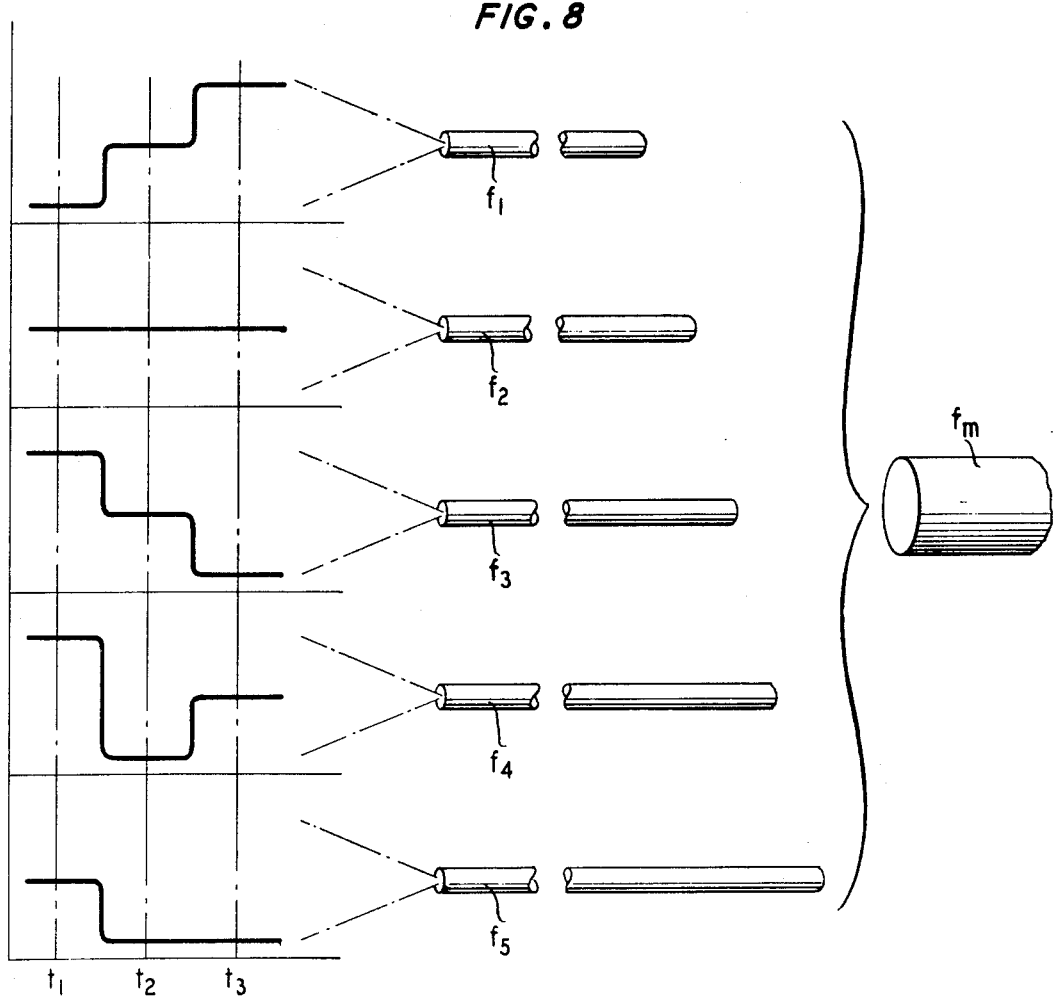
FIG. 8 is a schematic representation of the function of the apparatus of FIG. 7 in multiplexing video data onto a common optical fiber transmission channel.

In addition to the uses for multifiber and multicore fiber cable that were mentioned earlier another application will be described in connection with FIGS. 7 and 8. These show aspects of a large capacity high speed transmission system that uses a single fiber to transmit a time divided multiplexed signal over long distances. It assumes that the data originates as optical data, with many simultaneous bits, as, e.g., a video display as indicated at 70 in FIG. 7. A single video line is focused by optics 71 onto optical deflector 72, through a shutter indicated schematically at 73, and onto the ends of a multifiber cable. The ends of the cable are indicated as $f_1, f_2, f_3, \ldots f_n$ and are arranged along the line of the optical image. They can be arranged in any pattern that allows a portion of the picture elements to be focused appropriately to inject the light into the fibers. The cable 74 is designed according to the invention and can be a multifiber cable with the fibers $f_1-f_n$ arranged by varying length as shown. A multicore fiber such as that of FIG. 3 can be used as well by simply adding connecting stubs to channel the light from the image plane into the cable. FIG. 8 describes the multiplexing of the signals injected into the various fibers. An exemplary information sequence is indicated at the left of the figure. The information from five adjacent picture elements is shown as an idealized analog signal over a period divided into three time frames, $t_1, t_2, t_3$. The time frames correspond, e.g., to the video raster rate, or whatever sampling frequency is desired. The analog signal is shown here with three levels simply for simplicity. The five image elements are focused onto fibers $f_1-f_5$ in the manner already described. The shutter 73, operates at the bit rate which, for example, may be 50 nsec. The deflector operates at the sampling rate which in this case is the video frame time divided by number of raster lines. For the purpose of this illustration we will choose a video system that is 500 lines with 500 elements, n(for $f_n$) is 500. n can be reduced while maintaining the same format by operating another deflector in the vertical plane and focusing fewer elements at a time on the fiber array.

Figure 9:
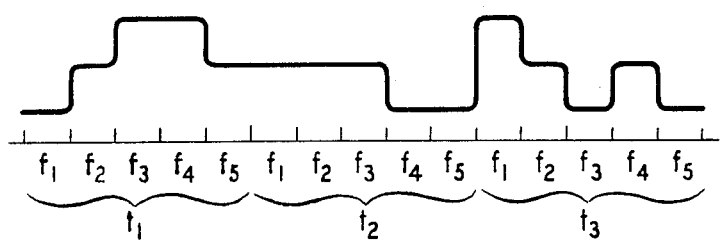
FIG. 9 is a multiplexed waveform, a composite of the multiple signals shown in FIG. 8.

The remote ends of the multifiber cable are combined onto a single fiber indicated as $f_m$ in FIG. 8. The multiplexed signal that will be launched into $f_m$, given the inputs shown in FIG. 8, is shown in FIG. 9.

The receiving end of the system shown can take advantage of another multifiber (or, it is to be understood in each case, multicore) cable operating, as it were, in reverse. The signal has thereby undergone coding and encoding by completely passive means.

In the example given, with the bit rate chosen at 50 nsec, it is possible to transmit the 500×500 video signal at the conventional frame rate of 1/30 sec. Interlace can be introduced quite simply by appropriate timing of deflector 73. There is no raster retrace time in this system and frame retrace can be eliminated by line scanning in the upward direction as well as downward.

Various additional modifications and extensions of this invention will become apparent to those skilled in the art. All such variations and deviations which basically rely on the teachings through which this invention has advanced the art are properly considered to be within the spirit and scope of this invention.

I claim:

1. An optical fiber cable comprising a central clad fiber situated at the center of the cable, and a plurality of clad fibers arranged around the periphery of the central fiber with the plurality of clad fibers having different fiber diameters and twisted about the center of the cable so that the length of the fibers differs over a given cable length.

2. The cable of claim 1 in which the fibers have plastic coatings of unequal thickness.

3. The cable of claim 1 in which the fibers have glass cladding of unequal thickness.

4. A transmission cable comprising a plurality of fiber waveguides arranged side-by-side in a retaining tape the cable characterized in that the tape is twisted over at least a substantial portion of its length about an axis corresponding to one of the edges of the tape so that the individual fiber waveguides have different lengths when unstrained.

5. A transmission cable comprising two cable sections the first comprising a plurality of fiber waveguides arranged side-by-side in a retaining tape with the tape twisted about an axis corresponding to one of the edges of the tape and the fiber waveguides having different lengths when unstrained and the second section comprising a plurality of fiber waveguides of essentially equal lengths.

6. The cable of claim 5 including a third section having the characteristics of the first section with the fiber waveguide situated closest to the said axis of the third section connected through the second section to the fiber waveguide in the first section located remote from the axis of the first section.

7. A multiwaveguide fiber comprising an elongated optical fiber having a cladding of refractive index $n_1$ and a plurality of cores within the fiber, wherein at least some of the cores have different refractive indexes that are greater than $n_1$.

8. A lightwave transmission system comprising means for producing a multiplicity of separate lightwave transmission channels at least some of which have controllably different lightwave transit times, said means comprising a dispersive optical cable having a bundle of individual fiber waveguides arranged at varying distances from the center of the cable and twisted about the center of the cable so that over the length of the cable individual fiber waveguides have different lengths and therefore provide different lightwave transit times, and with said system further comprising a single lightwave channel connected to said dispersive optical cable.

9. A lightwave transmission system comprising means for producing a multiplicity of separate lightwave transmission channels at least some of which have controllably different lightwave transit times, said means comprising a dispersive multicore optical fiber having a cladding surrounding a plurality of cores, wherein at least some of the cores have different refractive indexes and therefore provide different lightwave transit times, and with said system further comprising a single lightwave channel connected to said dispersive multicore optical fiber.

10. A lightwave transmission system comprising means for producing a multiplicity of seperate lightwave transmission channels at least some of which have controllably different lightwave transit times, said means comprising a dispersive multicore optical fiber having a cladding surrounding at least two cores, wherein the two cores are in the form of helical paths of unequal length and therefore provide different lightwave transit times, and with said system further comprising a single lightwave channel connected to said dispersive multicore optical fiber.

11. The system of claims 8, 9 or 10 further in combination with means for launching lightwave signals into the multiplicity of channels in a first timed sequence and means for receiving lightwave signals from the single channel in a second timed sequence different from the first.

12. The system of claim 11 in which the first timed sequence includes a pulse launched simultaneously into each channel and the second timed sequence includes a sequential pulse train representative of the simultaneous pulse dispersed as the result of the different transit times of the multiplicity of channels.

13. The system of claim 11 in which the first timed sequence includes a series of pulses each launched into one of the multiplicity of channels at different times and the second timed sequence includes a simultaneous pulse from each channel corresponding to the time divided pulses compressed by the different lightwave transit times of the multiplicity of channels.

* * * * *